United States Patent [19]

Flores et al.

[11] Patent Number: 4,532,626

[45] Date of Patent: Jul. 30, 1985

[54] COLLISION AVOIDING SYSTEM AND PROTOCOL FOR A TWO PATH MULTIPLE ACCESS DIGITAL COMMUNICATIONS SYSTEM

[75] Inventors: Christopher Flores, Berkeley, Calif.; Bhaskarpillai Gopinath; John O. Limb, both of Berkeley Heights, N.J.

[73] Assignee: AT&T Bell Laboratories, Murray Hill, N.J.

[21] Appl. No.: 399,428

[22] Filed: Jul. 19, 1982

[51] Int. Cl.³ ............................ H04J 3/02; H04J 3/00; H04J 6/00
[52] U.S. Cl. ......................................... 370/85; 370/94
[58] Field of Search ................ 370/85, 94; 340/825.51

[56] References Cited

U.S. PATENT DOCUMENTS

| | | | |
|---|---|---|---|
| 3,851,104 | 11/1974 | Willard et al. | 179/15 |
| 4,063,220 | 12/1977 | Metcalfe et al. | 340/147 |
| 4,161,786 | 7/1979 | Hopkins et al. | 364/900 |
| 4,210,780 | 7/1980 | Hopkins et al. | 370/80 |
| 4,281,380 | 7/1981 | DeMesa, III et al. | 370/85 |
| 4,332,027 | 5/1982 | Malcolm et al. | 370/94 |
| 4,412,326 | 10/1983 | Limb | 370/85 |

OTHER PUBLICATIONS

G. Hopkins, "Recent Developments on the MITRENET", Loc. Net. and Distr. Off. Sys., 1981, pp. 97–105.
L. Fratta et al., "The Express-Net: A Local Area Communication Network Integrating Voice and Data", Proc. ICPDCS&TA, Sep. 1981, pp. 77–88.
M. Marsan, "Map: An Insertion Protocol for an Unidirectional Bus Local Network", CNDRPFIC, Rep. 57, Feb. 1982.
R. Morling et al., "The MININET Internode Control Protocol", Proc. Comp. Net. Proto. Sym., Feb. 1978, pp. B4-1-B4-6.
G. Hopkins, "Multimode Communications on the MITRENET", Proc. of the Local Area Comm. Net. Sym., May 1979, pp. 169–177.
Mini-Circuits, "Directional Couplers", EEM Electron Eng. Mas., vol. 2, 1980, pp. 3312–3315.
F. Tobagi et al., "The Express-Net: A Local Area Communication Network Integrated Voice and Data", Comp. Sys. Lab., Tech. No. 220, 1981, pp. 1–45.

Primary Examiner—Douglas W. Olms
Assistant Examiner—Wellington Chin
Attorney, Agent, or Firm—Kurt C. Olsen; Henry T. Brendzel

[57] ABSTRACT

In order to control the transfer of packets of information among a plurality of stations, e.g., digital computers, the instant communications system, station and protocol contemplate first and second oppositely directed signal paths. At least two stations are coupled to both the first and the second signal paths. A station includes arrangements for reading one signal from the first path and for writing another signal on the first path. The one signal is read from the first path by an arrangement which electrically precedes the arrangement for writing the other signal on the first path. A similar read arrangement is electrically preceding a write arrangement on the second path. If the station has a packet to transmit, it can overwrite a busy control field of the one signal packet on either path. Having read the one signal on the path, a logical interpretation may be made within the station as to whether the path is busy or is not busy. If the path is not busy, the packet may be written on the path by overwriting any signal thereon. If the path is busy, the station may defer the writing until the path is detected as not busy through a busy control field. The packets flow down the path to a destination station. Eventually all packets will be transmitted and the busy control field may be detected at an end station for indicating the event that all packets have been transmitted. The end station on one path acts as the head station on the other oppositely directed path. Hence, responsive to detecting that all packets have been transmitted, the head station on the other path may transmit an end cycle packet, responsive to which event a new cycle may be started by initializing each station on the one path and by permitting each initialized station to transmit.

20 Claims, 6 Drawing Figures

COLLISION AVOIDING SYSTEM AND PROTOCOL FOR A TWO PATH MULTIPLE ACCESS DIGITAL COMMUNICATIONS SYSTEM

TECHNICAL FIELD

This invention relates to communications systems and, more particularly, to multiple access digital communications systems, stations and protocols for use therein.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals. For example, U.S. Pat. No. 3,851,104; entitled "Digital Communications System" and issued Nov. 26, 1974; discloses a time division, multiple access communications system which, under the control of a central terminal, provides communication links among a plurality of user terminals by way of a single communications signal path.

As the digital computer art advanced, parallel advances in the semiconductor art have lead to smaller, relatively inexpensive computers. With the advent of such smaller computers, the technique of central computer control is being abandoned in favor of a distributed control technique. Also, because of the usually bursty nature of digital information, the recent trend has also been toward communications systems having a capability for handling packets of digital information. One such distributed control communications system is disclosed in U.S. Pat. No. 4,063,220; entitled "Multipoint Data Communication System with Collision Detection" and issued Dec. 13, 1977. Indeed, the '220 patent discloses a communications system in which, when a terminal is to start an intended transmission on a communications path, a phased decoder detects the presence of other transmissions on the path and, responsive thereto, delays the intended transmission until no other transmissions are sensed. Once a transmission has started, if an interference (or collision) therewith is detected, a random number generator is used to select an interval of time at the completion of which the next transmission will be attempted.

Collisions being a problem, efforts exist in the art toward providing communication protocols for mitigating the deleterious effects of collisions. For example, one solution, called a slotted contention protocol, is disclosed in U.S. Pat. No. 4,161,786, entitled "Digital Bus Communications System" and issued July 17, 1979. Another solution, called an unslotted contention protocol, is disclosed in U.S. Pat. No. 4,210,780, entitled "Multiple Access Digital Communications System" and issued July 1, 1980. Unfortunately, the efficiency related to known multiple access digital communications system protocols tends to decrease as the digital signal bit rate increases, e.g., in a range of about 50-to-200 megabits per second.

To overcome such problems, the U.S. Pat. No. 4,439,763 by J. O. Limb, entitled "Collision Avoiding System and Protocol For a Multiple Access Digital Communications System", issued Mar. 27, 1984, and herein incorporated by reference, discloses a communications system, stations and protocol which contemplate a communications loop having first and second oppositely directed and interconnected signal paths. At least two stations are coupled to both the first and the second signal paths. A station writes a first signal on the first path and reads a second signal from the second path. In addition, the station reads a third signal from the first path. The third signal is coupled from the first path to the station by a reading arrangement which electrically precedes the arrangement for writing the first signal on the first path. If the station has a packet to transmit, it can overwrite a busy control field of the third signal packet on the first path. Having read the third signal on the first path, a logical interpretation may be made within the station as to whether the first path is busy or not busy. If the first path is not busy, the packet may be written on the first path by overwriting the third sigal thereon. If the first path is busy, the station may overwrite a request control field of the third signal for indicating that the station was unable to transmit the packet. The packets flow around the loop and are monitored on the second path. Eventually all packets will be transmitted and the request control field may be detected at the receive side of a head station for indicating the event that all packets have been transmitted, in which event a new cycle may be started by initializing each station on the loop and by permitting each station to transmit.

Still alternative solutions are being sought to further improve the efficiency of such systems.

SUMMARY OF THE INVENTION

This and other problems are solved in accordance with the principles of the instant invention in which an improved communications system, stations and a protocol for use in a communications system may be used both to avoid collisions on a communications path and to improve the efficiency of the system at relatively high digital bit rates. The communications system may include first and second oppositely directed, unidirectional communications signal paths. Each of at least two stations such as a digital computer may be coupled to both the first and the second paths. A station may write a first signal on the first path and read a second signal from the second path. A station may also read a third signal from the first path. The arrangement for reading the third signal may be electrically preceding the arrangement for writing the first signal on the first path. A station may also write a fourth signal on the second path. The arrangement for writing the fourth signal may be electrically succeeding the arrangement for reading the second signal on the second path. In response to the first, second, third and fourth signals, the communications system, station apparatus and its protocol avoid collisions on the communications paths. According to one aspect of the instant invention, a busy field of a packet may indicate that a respective path is either busy or not busy. If the path is not busy, the station may write a packet on the path. If the path is busy, the station may overwrite the busy control field for indicating that the station has a packet to transmit and that is it contending for the path. According to a second aspect of the instant invention, a station may transmit a plurality of packets. According to a third aspect of the instant invention, a predetermined priority of transmission may be established among the stations coupled to the communications paths.

BRIEF DESCRIPTION OF THE DRAWING

The invention should become fully apparent when taken in connection with the following detailed description and accompanying drawing in which.

DETAILED DESCRIPTION

Figure 1:
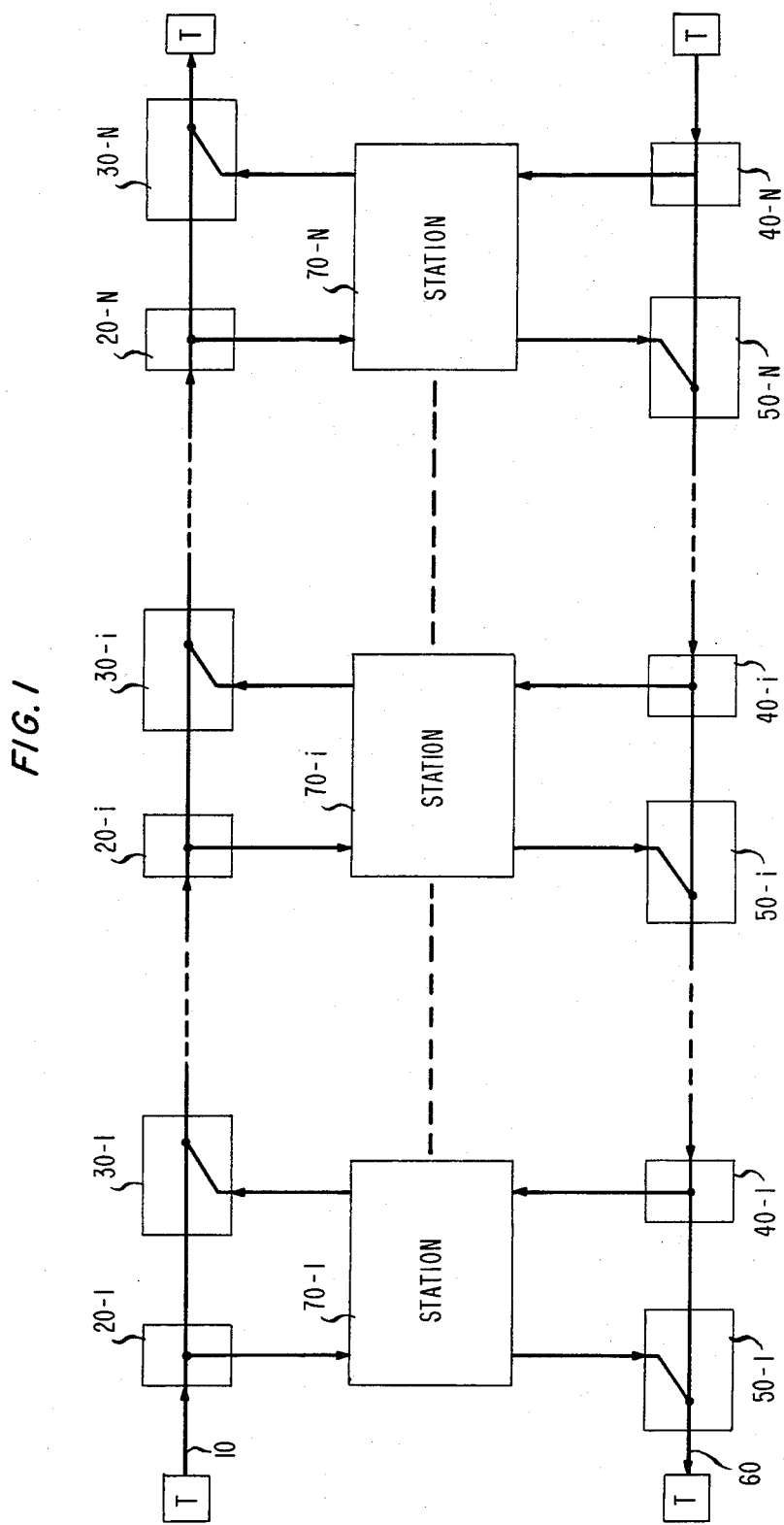
FIG. 1 illustrates an arrangement including a plurality of stations interconnected with two oppositely directed unidirectional communications paths which arrangement is useful in describing the principles of the invention.

Referring to the illustrative structure shown in FIG. 1, a first unidirectional communications signal path 10 is there illustrated as extended through a plurality of cascaded transmission couplers such as passive read coupler 20-i and passive write coupler 30-i. A second unidirectional signal path 60, which path is oppositely directed with respect to first path 10, is also there illustrated as extended through another plurality of cascaded transmission couplers such as passive read coupler 40-i and passive write coupler 50-i. Thus, each of stations 70-i through 70-N is twice coupled to each of the two oppositely directed communications paths.

More particularly, on the one hand, nondirectional read couplers 20-i and 40-i are for electrically coupling signals, which are detected on a respective first 10 or second 60 communications path to station 70-i. In that manner, station 70-i may monitor or read signals on both the first path and the second path. On the other hand, directional write couplers 30-i and 50-i are for coupling and inserting or writing signals from station 70-i onto the respective communications path. For example, the inserted signal could, responsive to a signal being priorly read from path 10 through the electrically preceding nondirectional read coupler 20-i, overwrite the first path signal through directional write coupler 30-i, e.g., by the energy of write signal being electrically added to the signal, if any, already on path 10. In parallel fashion, the inserted signal could, responsive to a signal being priorly read from path 60 through electrically preceding nondirectional read coupler 40-i, overwrite the second path signal through write coupler 50-i. In that manner, station 70-i may transmit a signal by causing the signal to be inserted or written on the communications path. As should be clear from FIG. 1, there are actually two transmit sides of the communications system. For example, as to station 70-i transmitting a packet, the packet would be transmitted on communications path 10 if the packet is destined for station 70-k where k is greater than i. On the other hand, if the packet is destined for station 70-j where j is less than i, the packet would be transmitted on communications path 60.

Advantageously, the structure illustrated in FIG. 1 need not include any electronics on either of paths 10 or 60. Rather, each path could include only passive couplers. Thereby, the likelihood of a path becoming electrically opened is mitigated and its reliability is increased. Alternatively, electronic amplifiers and the like may be included on a path for amplifying and compensating the path signals, e.g., in a system with a relatively long electrical path length. In such a system, responsive to the detection of an electrical open or other failure, one or more stations may be adapted to insert an electrical bridge between the first and second paths, thereby forming two or more separate systems to mitigate the deleterious effects of a failure.

Also advantageously, station 70-i may include station terminal equipment such as a digital computer or a straightforward digital interface unit, the interface unit, for example, for interconnecting paths 10 and 60 with another system, the other system perhaps being geographically distant from the instant system. As an aside, it is common in the art that, when the stations are electrically relatively close to each other, e.g., within about two miles of each other, such a system is referred to as a local communications network. Thus, in line with this advantage of the structure illustrated in FIG. 1, a plurality of local networks may be interconnected for forming a still larger communications system.

Before more particularly describing the operation of a system embodying the principles of the instant invention, some ancillary matters are first described.

Figure 2:
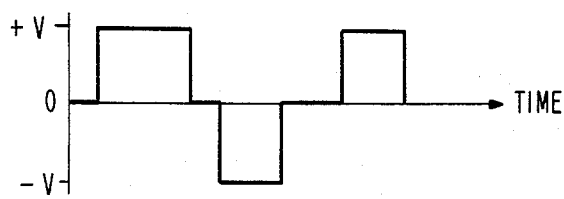
FIG. 2 illustrates bipolar digital signals useful in describing the principles of the invention.

As to electrical signals on the communications paths, assume for illustration and not by way of limitation a bipolar digital signal of the type illustrated in FIG. 2. Each logic zero is assumed to have a first voltage level potential, e.g., a zero level potential. On the other hand, a logic one or a sequence of consecutive logic ones may be transmitted at a second potential level (e.g., $+V$) until a next logic zero is to be transmitted. The logic zero may be transmitted, as aforedescribed, at the first potential level. After the logic zero or sequence of consecutive logic zeroes is transmitted, a then following logic one or a sequence of consecutive logic ones is transmitted at a third potential level, here the third potential level (e.g., $-V$) is illustratively the inverse of the second potential ($+V$) level. The logic one potential level may continue such alternations after each logic zero or sequence of consecutive logic zeroes.

Figure 3:
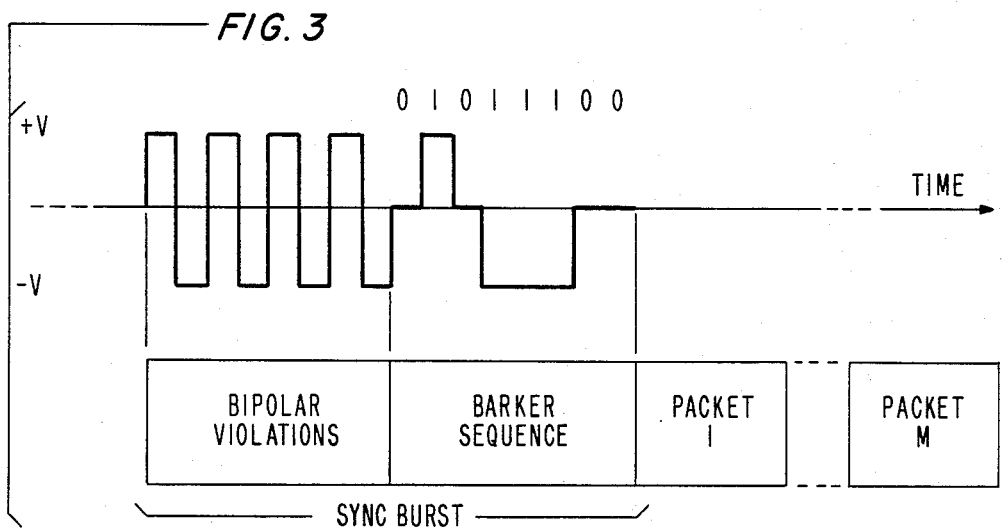
FIG. 3 illustrates a synchronizing signal and digital signal pattern useful in describing the principles of the invention.

As to synchronizing digital signals on the communications paths, assume for illustration and not by way of limitation a synchronizing digital signal sequence such as that illustrated in FIG. 3. The there illustrated synchronizing sequence is hereinafter called a sync burst and may be transmitted by any of the stations on a path, the sync burst transmitting station being referred to as the head station. As an aside, each half of the system, i.e., one half including first path 10 and the other half including second path 60, may simultaneously have a respective head station. Accordingly, for brevity of description, we assume for purposes of illustration that station 70-1 is the "head" station on path 10 while station 70-N is the "end" station on path 10. Conversely, station 70-N is the head station on path 60 while station 70-1 is the end station on path 60. As a further aside, if, as to path 10, station 70-j is assumed to be the head station and if for some reason station 70-j fails to operate properly, then station 70-(j+1) may adaptively become the head station. Of course the reverse would be the case for path 60. Hence, there is no central control terminal.

Continuing with reference to FIG. 3, although other synchronizing sequences could be used, the illustrative sync burst includes a plurality of bipolar violations followed by a predetermined digital sequence. Bipolar violations may include a succession of alternations between the second and the third potential levels with no intervening logic zero. It may be noted that such a sequence of alternations is contrary to the aforedescribed bipolar signal of FIG. 2, hence the term bipolar violation. The bipolar violations may be transmitted from the respective head stations and may be extended through respective read couplers 20-i and 40-i to synchronizing and timing circuitry of station 70-i for bit synchronizing the station circuitry and the respective path digital signals. Following a prefixed number of bipolar violations, the sync burst may further include a predetermined digital sequence such as the Barker sequence "01011100". The Barker sequence may also be transmitted from the respective head stations and may also be extended through respective read couplers 20-i and 40-i to synchronizing and timing circuitry of station 70-i for data synchronizing the station circuitry and the path digital signals. As a result, each of the plurality of stations on each of the two paths includes a straightforward arrangement for both bit synchronizing and data synchronizing the station in response to the detection of the sync burst of bipolar violations and Barker sequence.

As to inserting or writing a signal from a station onto a path, subsequent to the transmission of the sync burst, one or more packets of information, e.g., M packets, may be transmitted on the path. Indeed, a packet may, for example, be transmitted in a time slot as a time division multiplexed signal. However, absent a control protocol, collisions between the packets could occur. According to the principles of the instant invention, a hereinafter described control protocol may be used for controlling the signals on the system and for avoiding collisions.

Figure 4:
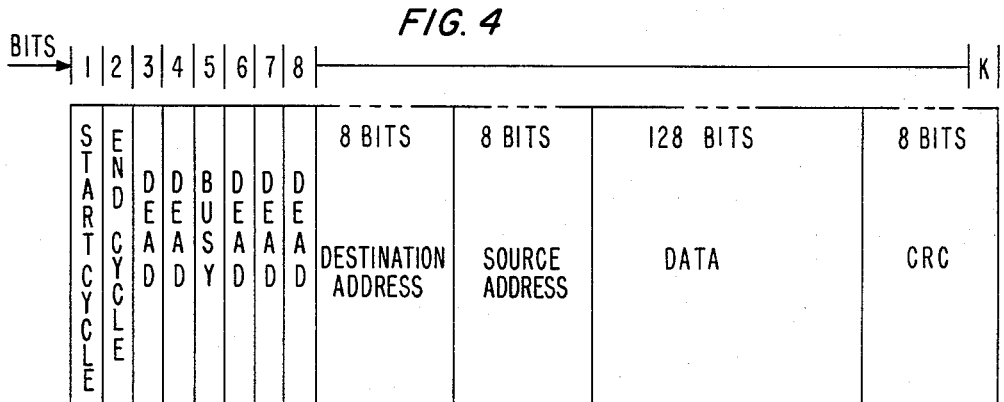
FIG. 4 illustrates a typical packet format including access control field useful in describing the principles of the invention.

As to the instant control protocol, FIG. 4 depicts an illustrative packet of predetermined size and comprising K bits, where for illustration and not by way of limitation K is assumed to equal 160 bits. Also, for illustration, a packet is assumed to include an access control field, which field in turn includes one or more bits. Here, the first eight bits of the illustrative data packet are labelled start cycle, end, dead, dead, busy, dead, dead and dead, respectively, and may comprise an access control field for the instant protocol. The packet may, as is common in the art, also include a destination station address field, a source station address field, a data field, and an error control field. Again, each field may include one or more bits. One error control field may also include a well known cyclic redundancy code (CRC). Also, the packet may be read from or written into a time slot of a time division multiplexed signal on the path.

Now that some ancillary matters have been described, the following description of one aspect of the instant control protocol for avoiding collisions, called a contention mode, focuses on the logical interpretation of the access control field.

Firstly, assume, as aforedescribed, that a sync burst has been transmitted from the respective head station on respective paths 10 and 60 for bit and data synchronizing each station. Thereafter, one or more data packets may be transmitted as a time division multiplexed signal. Each data packet is assumed to have the format illustrated in FIG. 4.

Secondly, as aforedescribed, read coupler 20-i (or 40-i) electrically precedes write coupler 30-i (or 50-i) for respectively coupling signals to and from station 70-i. Hence, as a packet is extended over path 10 (or 60), it may be read from path 10 (or 60) by way of read coupler 20-i (or 40-i) and overwritten on path 10 (or 60) by way of write coupler 30-i (or 50-i). In particular, the digital signal on path 10 (or 60) may continue down the path and concurrently may be coupled through read coupler 20-i (or 40-i) to read circuitry of station 70-i and therein through a logic arrangement for detecting and responding to the access control field including its protocol control bits. In responding to the control bits, for example, by overwriting the control bits or, for that matter, by overwriting any other field of the packet then on the path, write circuitry of station 70-i may cause signals to be extended from station 70-i through write coupler 30-i (or 50-i) to path 10 (or 60).

Thirdly, assume for purposes of illustration and not by way of limitation that each of the N stations may transmit a single packet during a time frame, which time frame is hereinafter referred to as a cycle. As will shortly be clarified station 70-N would not typically transmit a packet on path 10 while, conversely, station 70-1 would not transmit a packet on path 60. Thus only (N−1) stations would transmit on a path. Notwithstanding, the preceding is useful in describing the principles of our invention. Accordingly, in one embodiment, a cycle may include up to (M=)N packets. That is, there may be M time slots in a cycle, or time frame. In other embodiments, a cycle may include more or less than N packets. In any event according to the principles of the instant invention, the first packet in a cycle would have its start cycle bit set to a logic one by the head station. In general, all other packets in the cycle would have their respective start cycle bit set to a logic zero. Responsive to the detection of a logic one start cycle bit, each respective station on the path may set a respective "permit register" (hereinafter also called a p-register) to a logic one for indicating that the station may transmit a packet. As hereinafter described, after a station has transmitted a packet, the station resets its permit register to a logic zero for indicating that the station may not transmit a packet. Indeed, each station could have two permit registers, one p-register being related to path 10 and the second p-register being related to path 60.

Fourthly, each station which has a packet to be transmitted may, responsive to its respective permit register being set to a logic one, extend a logic one through its write coupler 30-i (or 50-i) to path 10 (or 60) for overwriting the busy bit of the read packet, here illustratively bit 5 of the packet shown in FIG. 4. The overwriting of the busy bit with a logic one may occur whether or not the busy bit being overwritten is already a logic one.

Fifthly, read circuitry of station 70-i includes circuitry for reading the busy bit. Assume that station 70-i has a packet to transmit and that its permit register is set to a logic one. As mentioned, the busy bit is overwritten with a logic one. However, as is evident from FIG. 1, read coupler 20-i (or 40-i) electrically precedes write coupler 30-i (or 50-i) and the two couplers may be a relatively short electrical distance apart. As should also be evident from FIG. 1, some finite time interval may be needed for determining whether or not the packet may be written onto the path, e.g., the determining action including interpreting the contents, or logic value, of the busy bit of the packet being read. Experimentation has indicated that a relatively few bit time intervals allow adequate time for such a determination. Hence, in the instant embodiment, the dead, or "don't care", control bits allow three bit time intervals, e.g., the time interval of dead bits 6, 7 and 8 of the read packet, for allowing an adequate time interval during which read circuitry of station 70-i may interpret or determine the logic value of the busy bit of the packet being read.

On the one hand, if the contents of the busy bit of the packet being read is detected as a logic zero, the packet to be written may be written through write coupler 30-i (or 50-i) onto path 10 (or 60). For example, the packet writing could include the writing of some (K-8) bits, or in the instant example 152 bits, which comprise a destination address, a source address, data, and a CRC code, as is evident from FIG. 4. As mentioned, the station then may reset its permit register to a logic zero for indicating that the station may not transmit a packet.

On the other hand, if the contents of the busy bit of the packet being read is detected as a logic one, the packet to be written is not then written. Indeed, if the packet were written, a collision would occur. Instead, according to the collision avoiding principles of our invention and responsive to the busy bit of the read packet being a logic one, write circuitry of station 70-i makes a transition from an IDLE state into a WAIT state, as will later be made more clear in connection with the state diagram of FIG. 6.

Thus, in summary, a station may transmit only when its permit register is set to a logic one and when a read busy bit is a logic zero. After having transmitted a packet, the station sets its permit register to a logic zero. If a station has a packet for transmission and if its permit register is a logic one, the station can overwrite the busy bit with a logic one and transmit its packet. Thereafter, as packets flow over respective path 10 or path 60, the packets are read on the receive side of station 70-i through respective read coupler 20-i or 40-i.

Each station 70-i can monitor the path for packets having, among other things, a destination address identifying the respective station as the addressed or called station. Upon detection of a destination address for identifying station 70-i as the addressed station, receive side read circuitry in station 70-i can thereafter read the packet and process the packet in whatever manner the station may have been programmed or adapted to do.

According to a second aspect of the instant control protocol for avoiding collisions, called a random mode, a station may transmit a plurality of packets. For example, assume that station 70-i has one or more packets to transmit and that its permit register is set to a logic one. If the busy bit of the packet being read is a logic zero, the write circuitry of station 70-i may overwrite the busy bit with a logic one and proceed, as aforedescribed, to write the packet on path 10 (or 60) through write coupler 30-i (or 50-i). Indeed, station 70-i may continue to write still other packets on path 10 (or 60) until one of the following two conditions is detected:

(a) either station 70-i has no more packets to transmit or
(b) the busy bit of the packet being read is detected as a logic one.

Responsive to the detection of either of the aforesaid two conditions, the station may, for example, be adapted to automatically convert to the aforedescribed contention mode.

According to a third aspect of the instant control protocol for avoiding collisions, called a priority mode, one or more predetermined station(s) may each transmit packets during a cycle in such a way as to define a priority among the stations. For example, each predetermined station may include a multibit packet counter register in lieu of the aforedescribed single bit permit register. (The packet counter is also hereinafter referred to as the p-register.) Also, each predetermined station may transmit a respective predetermined number of packets during a cycle, thereby defining a relative priority among the stations during the cycle. More particularly, responsive to the detection of a start cycle logic one, usually in the first packet of a cycle, circuitry in station 70-i may reset a packet counter to a respective predetermined value PMAX(i) for station 70-i, i.e., p-register is set to PMAX(i). Indeed, each station could have two packet counters, one p-register being related to path 10 and the second p-register being related to path 60. Also the two counters could be reset to the same or different respective predetermined values. Further, each respective counter may be decremented for each packet transmitted on a respective path during the cycle. Responsive to the counter being decremented to a zero value, the station may be inhibited from transmitting other packets on the path during the cycle. As an aside, it may be noted that a packet counter value of zero parallels the aforedescribed permit register having a logic zero. Thereby, each predetermined station on the path may transmit one or more packets during a cycle according to a predermined priority and the priority may be different on each path.

Figure 5:
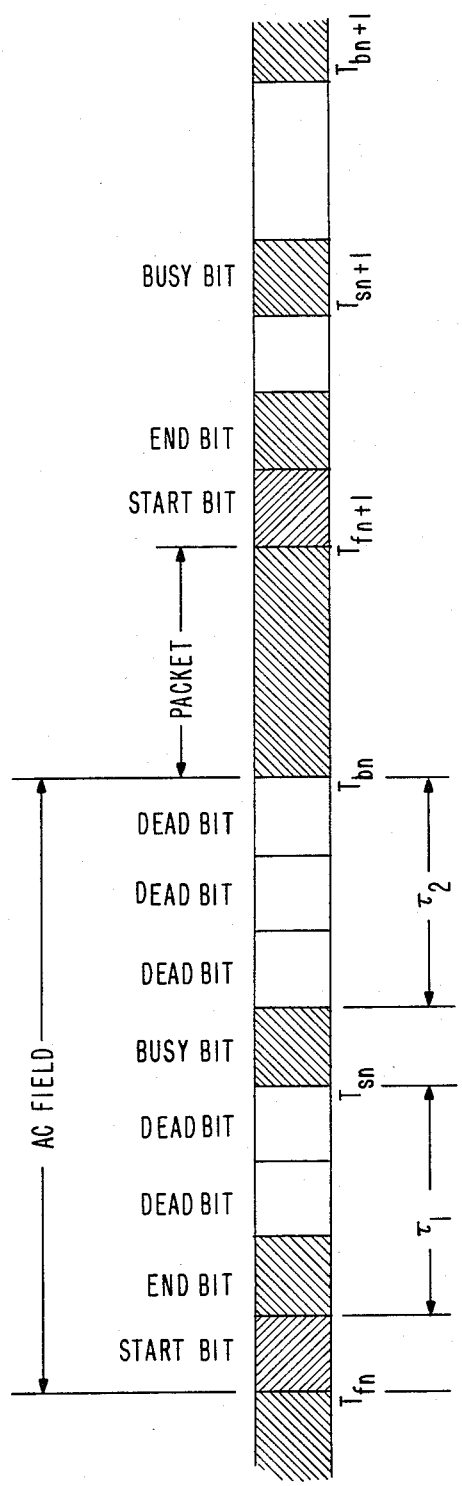
FIG. 5 illustrates a time sequence for a packet of the type illustrated in FIG. 4 which is useful in describing the principles of the invention.

Even more particularly, and referencing FIGS. 5 and 6, each station 70-i may include a respective queue counter, also hereinafter referred to as a q-register, for counting the number of packet ready, i.e., in a queue, for writing respectively on each of paths 10 and 60. If a station has no packets ready for writing on a path, the queue counter for that path could contain a count of zero, and the station user or remain in an IDLE state with respect to that path. If a station has one or more packets for writing on the path, the queue counter could contain a nonzero count and the station would make a transition from the IDLE state to a WAIT state.

For brevity of description, the instant access control protocol is hereinafter described with respect to communications path 10. From the foregoing, it should be clear that an equivalent protocol obtains with respect to path 60. Further, as to the queue counter, Q10(i) will identify the q-register and the number of packets queued at station 70-i for access to communications path 10. In parallel fashion, Q60(i) could identify the q-register and the number of packets queued at station 70-i for access to communications path 60. As packets become ready for transmission from station 70-i, i.e., enter the queue, Q10(i) is incremented by one. As a packet is transmitted from station 70-i, Q10(i) is decremented by one. Still, further we assume that station 70-i is permitted to transmit PMAX10(i) packets on path 10 during a cycle. In that manner and as priorly described, the different stations may have different transmission priorities.

Continuing, each head station may transmit a start cycle packet for initiating a new cycle on the communications path, e.g., transmit a packet including a logic one start cycle control bit. Also assume a nonzero q-register. Referring to FIG. 5, at time $T_{fn}$ which time identifies the start of the n-th time "slot", the start cycle bit on path 10 is extended through read coupler 20-i to station 70-i. On the one hand, responsive to the start cycle bit being a logic zero, station 70-i remains in the aforesaid WAIT state. On the other hand, responsive to the start cycle bit being a logic one, station 70-i makes a transition from the WAIT state to the DEFER state and concurrently may set its packet counter, i.e., its p-register, to PMAX10(i). It should be noted that, as a result of time delays such as that in the decision circuitry of station 70-i as well as signal propagation delays in the coupling, the outcome of a read operation is not known until some time later. This time is illustrated in FIG. 5 as $\tau_1$ and would typically be in the order of a few bit time intervals for a 100 megabit per second line and nanosecond logic. Here, for example, in FIGS. 4 (and 5) three bit time intervals are assumed to be an adequate time for determining the contents of a start cycle bit and are labeled respectively "end cycle" (and "end bit"), "dead" and "dead". Indeed the three intervals may be logically "don't care" bits but as will later be described one interval serves a dual function, i.e., is also used as an "end cycle" bit.

At time $T_{sn}$ the busy bit may be extended through read coupler 20-i to station 70-i. If station 70-i has a packet for transmission on path 10, e.g., if Q10(i) is greater than or equal to one, a logic one is extended through write coupler 30-i for overwriting the busy bit on path 10. As priorly mentioned, the overwriting of the busy bit can occur whether the read busy bit is a logic zero or a logic one. Indeed, a second delay $\tau_2$ may occur after the busy bit has been read and before the circuitry has determined the logic value of the read busy bit. At the expiration of the second delay, station 70-i may determine whether a logic zero or a logic one busy bit was read. Hence, at time $T_{bn}$ if the read busy bit is a logic one, station 70-i does not transmit but rather remains in the DEFER state. At time $T_{bn}$ if the read busy bit is a logic zero, station 70-i, having already overwritten the busy bit on path 10, enters an ACCESS state and transmits one or more of its packet on path 10, i.e., PMAX10(i) packets. The station remains in the ACCESS state (a) until the packet counter becomes zero, i.e., until the p-register becomes zero which would occur when PMAX10(i) packets have been written or
(b) until the queue counter, or q-register, becomes zero, i.e., until Q10(i)=0 or
(c) until a read busy bit is detected as a logic one.

While in the ACCESS state, the packet counter and queue counter are decremented by one after a packet is transmitted while the queue counter is incremented by one when a packet becomes ready and enters the queue. Upon the packet counter becoming zero and the queue counter remaining nonzero, the station makes a transition from the ACCESS state to the aforedescribed WAIT state. Upon the queue counter becoming zero, the station makes a transition from the ACCESS state to the aforedescribed IDLE state. Upon detecting the read busy bit as a logic one, the station makes a transition from the ACCESS state to the DEFER state.

Figure 6:
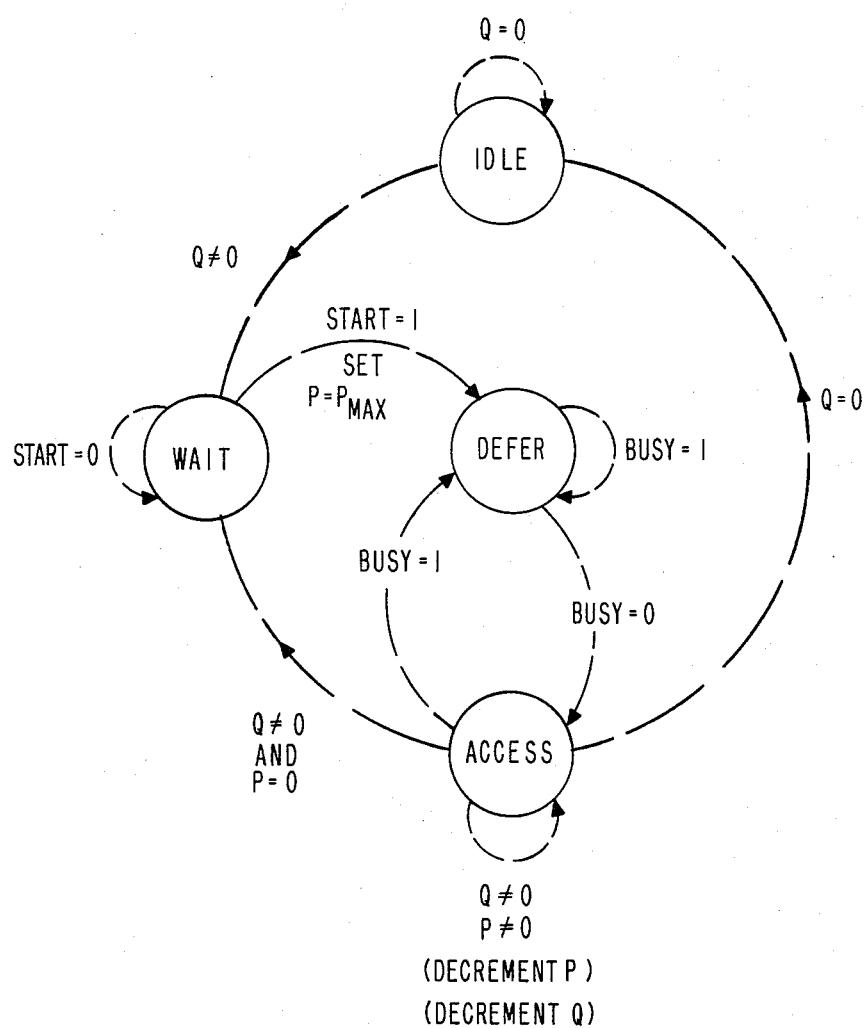
FIG. 6 illustrates in state diagram form a protocol includable in each of the stations in FIG. 1 and which is useful in describing the principles of the invention.

FIG. 6 then illustrates for one of the two paths and for one of the N stations the aforedescribed access control protocol. Clearly the protcol applies to path 10 as well as to path 60 and hence to a multiple access digital communications system.

Thus, each station 70-i can be in one of four states:
 (a) an IDLE state—if the station has no packets to transmit, i.e., while Q(i)=0
 (b) a WAIT state—if the station is waiting for a start of cycle i.e, while START=0;
 (c) a DEFER state—if the station has read a logic one busy bit from the communications path, i.e., while BUSY=1; and
 (d) an ACCESS state—if the station is accessing the path and writing a packet, i.e., Q(i)≠0 and p≠0.

Accordingly, in summary, upon arrival of a packet for transmission on a communications path, e.g., when Q the q-register becomes greater than zero, a transfer occurs from the IDLE state to the WAIT state. The station reads the start cycle bit for each packet detected on the communications path. Responsive to the start cycle bit being a logic one, the station transfers to the DEFER state. While in the DEFER state, the station overwrites the busy bit of the packets on the communications path with a logic one but only after having read the busy bit. Responsive to reading a logic zero busy bit, the station transfers to the ACCESS state. While in the ACCESS state a station may access the line for transmitting PMAX(i) packets for overwriting the busy bit of the read packet with a logic one for each packet to be transmitted. But again, the station reads the busy bit before overwriting same. Responsive to reading a logic one busy bit, the station transfers back to the DEFER state. Upon detecting a zero q-register, i.e., Q=0, the station transfers from the ACCESS state to the IDLE state. If PMAX(i) packets are transmitted by the station before the q-register becomes zero, the station transfers from the ACCESS state to the WAIT state and remains there until a next cycle, i.e., until a start cycle logic one is detected in the read packet.

It should be clear that station 70-N would not usually transmit packets on communications path 10. That is, all packets transmitted from station 70-N would be transmitted on communications path 60. Accordingly, responsive to station 70-N detecting a logic zero busy bit on path 10, station 70-N transmits an end cycle packet on communications path 60. The end cycle packet includes a logic one end cycle bit, which may be conveniently located after the start cycle bit, or after the busy bit which location is shown in FIG. 4 to include a don't care bit. Upon detection by station 70-1 of a logic one end cycle bit on path 60, station 70-1, which is the end station on path 60 but the head station on path 10, may initiate a start cycle packet on communications path 10 for commencing a new cycle. It should also be clear that the foregoing description relative to communications path 10 is substantially identical with respect to communications path 60 with the specific head and end stations being reversed.

Although the invention has been described and illustrated in detail, it is to be understood that same is by way of illustration and example only. For brevity, some alternative modifications of the principles of the invention have been disclosed. Still other modifications of the principles of the invention will occur to those skilled in the art, e.g., logic values could be inverted or access control field bits could be relocated. Accordingly, the invention is not to be considered limited by the embodiment(s) shown and thus the spirit and scope of the invention are limited only by the appended claims.

What is claimed is:

1. A method for controlling digital signals in a communications system, said system including a plurality of stations, at least two of said stations being coupled to both a first and a second signal path, said method including the steps of writing signals on said first path and reading signals from said second path and characterized in that
   said signals on said first path include first control and data signals,
   said signals on said second path include second control and data signals,
   said first and second paths are, separate, independent, unidirectional and oppositely directed with respect to each other, and
   said method further comprising the steps of
   reading said first control signals from said first path, said first path reading step occurring logically before said writing on said first path,
   responsive to first control signals read from said first path avoiding a collision on said first path,
   writing second control signals on said second path, said second path writing step occurring logically after said reading from said second path
   responsive to second control signals read from said second path, avoiding a collision on said second path.

2. The method defined in claim 1 wherein said respective collision avoiding step further comprises the step of
   overwriting a busy control field of a first packet on said respective path with a signal for indicating that a station has a second packet to transmit on said respective path.

3. The method defined in claim 2 wherein said respective collision avoiding step further comprises the steps of
   reading a busy control field of said first packet, said first packet busy control field having been read prior to its being overwritten, and
   responsive to said priorly read busy control field indicating that said respective path is not busy and responsive to said station having said second packet to transmit, entering an access state and writing said second packet on said respective path, said second written packet thereby overwriting any packet on said first path.

4. The method defined in claim 2 wherein said respective collision avoiding step further comprises the steps of
   reading a busy control field of said first packet, said first packet busy control field having been read prior to its being overwritten, and
   responsive to said priorly read busy control field indicating that said respectve path is busy, entering a defer state until a priorly read busy control field indicates that said respective path is not busy.

5. The method defined in claim 2 wherein said respective collision avoiding step further comprises the steps of:
   reading a busy control field of said first packet, said first packet busy control field being read prior to its being overwritten,
   responsive to said priorly read busy control field indicating that said respective path is not busy and responsive to the event that no station on said respective path was unable to transmit a packet, writing an end cycle packet on said other respective path.

6. The method defined in claim 2 wherein said respective collision avoiding step further comprises the steps of
   reading said end cycle packet on said other respective path and
   responsive to said end cycle packet, initiating a start cycle packet on said respective path, said start cycle packet being transmitted by a head station on said respective path and said start cycle packet including a start cycle field responsive to which a station on said respective path may be initialized to transmit a packet.

7. A communications system comprising a first and a second communications signal path, a plurality of stations, each of at least two of said stations being coupled to both said first and said second signal paths, a station including means for writing a first signal on said first path and means for reading a second signal from said second path and characterized in that
   said signals on said first path include first control and data signals,
   said signals on said second path include second control and data signals,
   said first and second paths are, separate independent, unidirectional and oppositely directed with respect to each other, and
   said system further comprises:
   means for avoiding collisions on said first communications path, said first path collision avoiding means including
   means for reading a third signal from said first control signals on said first path, said first path reading means being coupled to said first path in a manner logically preceding said first path writing means,
   means for avoiding collisions on said second communications path, said second path collision avoiding means including means for writing a fourth signal as one of said second control signals on said second path, said second path writing means being coupled to said second path in a manner logically succeeding said second path reading means.

8. The system defined in claim 7 wherein each of said four signals includes a predetermined packet format, said packet format including a packet field and an access control field and wherein said respective collision avoiding means further comprises:
   means for reading the contents of said access control field of said respective read signals and
   means for overwriting the contents of said control field of any packet on said respective path.

9. The system defined in claim 7 wherein said respective collision avoiding means further comprises:
   means for writing first contents in a busy control field of said respective read signal, said first contents for indicating that said station has a packet to transmit.

10. The system defined in claim 9 wherein said respective collision avoiding means further comprises:
    means, responsive to second contents of said busy control field of said respective read signal, for writing a packet on said respective path, said second contents for indicating that said respective path is not busy.

11. The system defined in claim 9 wherein said respective collision avoiding means further comprises:
    means for reading the contents of a busy control field of said respective read signal, said read signal busy control field having been read prior to its being overwritten with said first contents, means, responsive to said priorly read signal busy control field indicating that said respective path is not busy and responsive to the event that no station on said respective path was unable to transmit a packet, for writing an end cycle packet on said other respective path.

12. The system defined in claim 7 wherein said respective collision avoiding means further comprises:
means, responsive to second contents of a busy control field of said respective read signal, for writing a packet on said respective path, said second contents for indicating that said respective path is not busy.

13. The system defined in claim 11 wherein said respective collision avoiding means further comprises:
means, responsive to said end cycle packet on said other respective path, for initiating a start cycle packet on said respective path, said start cycle packet being transmitted by a head station on said respective path and said start cycle packet including a start cycle field responsive to which a station on said respective path may be initialized and permitted to transmit a packet.

14. Station apparatus adapted for use in a communications system, said station apparatus being adapted to be coupled to each of said signal paths and including means adapted to write a first signal on said first path and means adapted to read a second signal from said second path and characterized in that
said signals on said first path include first control and data signals,
said signals on said second path include second control and data signals,
said first and second paths are, separate independent, unidirectional and oppositely directed with respect to each other, and
said station apparatus further comprises:
means for avoiding collisions on said first path, said first path collision avoiding means including
means for reading a third signal from said first control signals on said first path, said first path reading means being adapted to be coupled to said first path in a manner logically preceding said first path writing means,
means for avoiding collisions on said second communications path, said second path collision avoiding means including
means for writing a fourth signal as one of said second control signals on said second path, said second path writing means being adapted to be coupled to said second path in a manner logically succeeding said second path reading means.

15. The station apparatus defined in claim 14 wherein each of said four signals includes a predetermined packet format, said packet format including a packet field and an access control field and wherein said respective collision avoiding means further comprises:
means for reading said access control field of said respective read signals and
means for overwriting said control field of any packet on said respective path.

16. The station apparatus defined in claim 14 wherein each of said respective collision avoiding means further comprises:
means for writing first contents in a busy control field of said respective read signal, said first contents for indicating that said station has a packet to transmit.

17. The station apparatus defined in claim 16 wherein said respective collision avoiding means further comprises:
means, responsive to second contents of said busy control field of said respective read signal, for writing a packet on said respective path, said second contents for indicating that said respective path is not busy.

18. The station apparatus defined in claim 16 wherein said respective collision avoiding means further comprises:
means for reading a busy control field of said respective read signal, said read signal busy control field having been read prior to its being overwritten with said first contents,
means, responsive to said priorly read signal busy control field indicating that said respective path is not busy and responsive to the event that no station on said respective path was unable to transmit a packet, for writing an end cycle packet on said other respective path.

19. The station apparatus defined in claim 14 wherein each of said respective collision avoiding means further comprises:
means, responsive to a busy contol field of said respective read signal indicating that said respective path is not busy, for writing a packet on said respective path.

20. The station apparatus defined in claim 18 further comprising said station being adapted to operate as a head station, and wherein said respective collision avoiding means further comprises:
means, responsive to said end cycle packet on said other respective path, for initiating a start cycle packet on said respective path, said start cycle packet being transmittted by said head station on said respective path and said start cycle packet including a start cycle field responsive to which a station on said respective path may be initialized and permitted to transmit a packet.

* * * * *